G. W. BLAKE.
Steam-Trap.

No. 196,109. Patented Oct. 16, 1877.

Witnesses
John Becker
Fred. Haynes

G. W. Blake
by his Attorneys
Brown & Allen

UNITED STATES PATENT OFFICE.

GEORGE W. BLAKE, OF NEW YORK, N. Y., ASSIGNOR TO THE ANGELL & BLAKE MANUFACTURING COMPANY, OF SAME PLACE.

IMPROVEMENT IN STEAM-TRAPS.

Specification forming part of Letters Patent No. 196,109, dated October 16, 1877; application filed April 3, 1877.

*To all whom it may concern:*

Be it known that I, GEORGE W. BLAKE, of the city, county, and State of New York, have invented a new and useful Improvement in Steam-Traps, of which the following is a description, reference being had to the accompanying drawing, forming part of this specification.

This invention, which is applicable to radiators and other purposes, consists in a steam-trap in which duplicate leaf buckling springs, carried at their ends by a loose intermediate metal bar or holder having an inferior expansive action than the springs, are combined, for operation or control of the valve, with an inlet arranged to connect with opposite ends of the trap.

It also consists in a combination, with the duplicate leaf buckling springs and their intermediate bar or holder, of adjusting and supporting screws, on which one of said springs rests, and the valve of the trap having its stem connected with the other of said springs.

In a trap constructed in accordance with this invention, the valve is closed by the buckling of the springs, and opened by the straightening of them, the distribution of the steam over the whole length of the springs is insured, every facility is afforded for cleaning and repair, and a most perfect and sensitive action generally is obtained.

Figure 1:
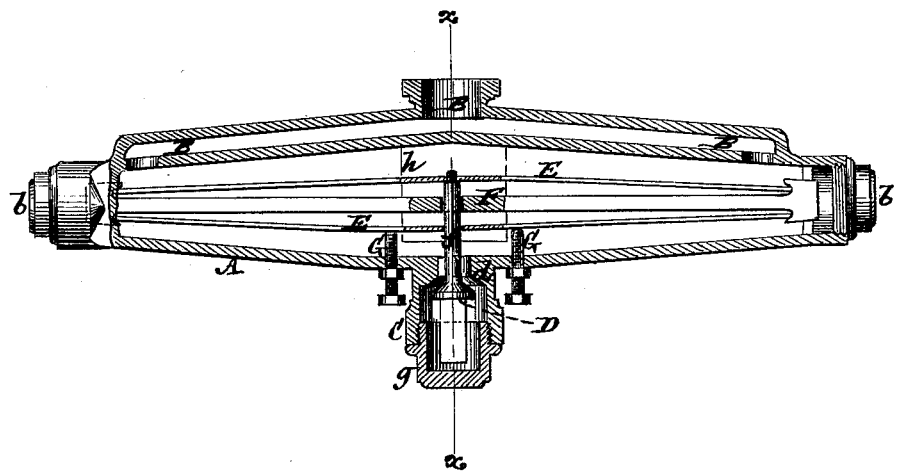
Figure 2:
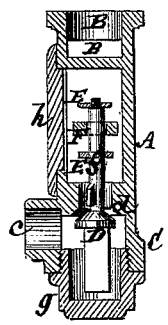

Figure 1 represents a longitudinal vertical section of a steam-trap constructed in accordance with my invention, and Fig. 2 a transverse section thereof on the line $x\ x$.

A is the case of the trap. Said case is fitted with screw caps or plugs $b\ b$ at its opposite ends, through either of which latter the springs that control the valve and bar carrying said springs may be inserted.

B' is the inlet-opening through the upper portion of the case, at its center, and communicating with opposite ends of the case or space thereof, which contains the springs of the trap, in order that the steam entering the trap may be distributed over the whole surface of the springs throughout their length, and not pass straight through the trap to the valve without fully acting on the springs.

C is the valve-box, on the under side of the case A, at or near its center; and $c$, the outlet thereof. D is the valve, and $d$ the valve-seat.

E E are the duplicate leaf buckling springs, arranged within the case A, and hooking at their ends into an intermediate bar or holder, F, which is loose, or free to slide up and down within the case A, and expand or contract therein. This intermediate bar F may be of iron, and the springs E E of brass; or said bars be otherwise constructed, so that said springs have a superior expansibility over or as compared with the bar which carries them, thereby causing said springs to buckle or bow when a sufficient heat is applied to them. The lower one of these springs E rests upon set-screws G, which serve to adjust the trap when put together. The valve-stem $f$ passes loosely through this lower spring and through the bar F, but is screwed at its upper end into the upper one of the springs E until a shoulder on the stem meets said spring.

The valve D, it will be observed, does not open against the pressure of the steam, whereby the trap may have an enlarged opening, and, consequently, be adapted to drain a large amount of pipe; nor is the valve closed by an independent spring, but by the united buckling or bowing action of the springs E E. A combined straightening action of said springs opens the valve, and the operation of both opening and closing the valve is a positive one. No air or water can collect in the trap to interfere with its action, inasmuch as the entering steam is distributed all over the springs and throughout the case, by reason of the construction of the inlet leading to either end of the case, and a perfect or sensitive action of the springs is necessarily obtained. Once adjusted, the trap is always in order, and may be readily cleaned by simply removing a cap, $g$, on the lower end of the valve-box, and afterward taking out the valve-stem with its attached valve. In case of any great collection of sediment, a plate, $h$, may be removed from the side of the trap.

I claim—

1. The combination, with the duplicate bowed or leaf buckling springs E E and their intermediate bar or holder F, of the case A, having its inlet B constructed and arranged to connect with opposite ends of the trap or chamber thereof containing said springs, substantially as specified.

2. The combination, with the duplicate bowed or leaf buckling springs E E and their intermediate bar or holder F, of the adjusting and supporting screws G G, on which one of said springs rests, and the valve D, having its stem $f$ connected with the other of said springs, essentially as described.

GEO. W. BLAKE.

Witnesses:
 BENJAMIN W. HOFFMAN,
 FRED. HAYNES.